US009612757B2

(12) United States Patent
Chakrabarti

(10) Patent No.: US 9,612,757 B2
(45) Date of Patent: Apr. 4, 2017

(54) ASYNCHRONOUS CONSISTENT SNAPSHOTS IN PERSISTENT MEMORY STORES

(71) Applicant: HEWLETT-PACKARD DEVELOPMENT COMPANY, L.P., Houston, TX (US)

(72) Inventor: Dhruva Chakrabarti, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 133 days.

(21) Appl. No.: 14/436,048

(22) PCT Filed: Oct. 19, 2012

(86) PCT No.: PCT/US2012/060959
§ 371 (c)(1),
(2) Date: Apr. 15, 2015

(87) PCT Pub. No.: WO2014/062191
PCT Pub. Date: Apr. 24, 2014

(65) Prior Publication Data
US 2015/0261463 A1 Sep. 17, 2015

(51) Int. Cl.
*G06F 3/06* (2006.01)
*G06F 11/14* (2006.01)
(Continued)

(52) U.S. Cl.
CPC .......... *G06F 3/0619* (2013.01); *G06F 3/0655* (2013.01); *G06F 3/0679* (2013.01);
(Continued)

(58) Field of Classification Search
None
See application file for complete search history.

(56) References Cited

U.S. PATENT DOCUMENTS 5,721,918 A * 2/1998 Nilsson ............... G06F 11/1471
5,864,657 A 1/1999 Stiffler
(Continued)

OTHER PUBLICATIONS

PCT Search Report/Written Opinion—Application No. PCT/US2012/060959 dated Apr. 25, 2013—9 pages.
(Continued)

*Primary Examiner* — Kaushikkumar Patel
(74) *Attorney, Agent, or Firm* — Trenner Law Firm, LLC

(57) ABSTRACT

Crash recovery with asynchronous consistent snapshots in persistent memory stores of a processing environment. A processing environment includes a user program and infrastructure-maintained data structures. The infrastructure-maintained data structures include a log of updates made to program data structures and a snapshot of the state of the program data structures. The systems and methods include writing log entries in the log to a transient memory. The log entries correspond to store instructions and memory management instructions operating on a nonvolatile memory (NVM), and input/output (I/O) operations executed by program instructions of the user program. Each of the log entries represents an effect of a corresponding operation in the program instructions. The systems and methods also include creating a snapshot in the NVM after a consistent program point based on the log of updates. The snapshot provides a rollback position during restart following a crash.

14 Claims, 5 Drawing Sheets

(51) Int. Cl.
*G06F 9/38* (2006.01)
*G06F 11/20* (2006.01)

(52) U.S. Cl.
CPC ........ *G06F 9/3863* (2013.01); *G06F 11/1435* (2013.01); *G06F 11/1438* (2013.01); *G06F 11/1469* (2013.01); *G06F 11/1471* (2013.01); *G06F 11/2069* (2013.01); *G06F 11/2082* (2013.01); *G06F 2201/82* (2013.01); *G06F 2201/84* (2013.01); *G06F 2201/855* (2013.01); *G06F 2206/1014* (2013.01)

(56) References Cited

U.S. PATENT DOCUMENTS

| | | | | |
|---|---|---|---|---|
| 5,864,849 | A * | 1/1999 | Bohannon | G06F 11/1471 707/648 |
| 6,026,499 | A * | 2/2000 | Shirakihara | G06F 11/1407 709/224 |
| 7,383,465 | B1 * | 6/2008 | van Rietschote | G06F 11/1471 714/13 |
| 7,702,949 | B2 * | 4/2010 | Erstad | G06F 11/1407 714/2 |
| 7,739,464 | B1 | 6/2010 | Coulter et al. | |
| 8,099,627 | B1 * | 1/2012 | Shah | G06F 11/1438 714/16 |
| 8,190,812 | B2 | 5/2012 | Yano et al. | |
| 8,255,616 | B2 | 8/2012 | Scouller et al. | |
| 2003/0084276 | A1 | 5/2003 | Levidow et al. | |
| 2004/0168030 | A1 * | 8/2004 | Traversat | G06F 9/45504 711/133 |
| 2005/0034014 | A1 * | 2/2005 | Moser | G06F 9/485 714/17 |
| 2008/0228879 | A1 | 9/2008 | Cardone et al. | |
| 2010/0169597 | A1 | 7/2010 | Yonezawa et al. | |
| 2011/0289289 | A1 * | 11/2011 | Leshinsky | G06F 11/1448 711/162 |
| 2012/0066182 | A1 | 3/2012 | Chang et al. | |
| 2012/0089571 | A1 | 4/2012 | Mereer et al. | |
| 2012/0179650 | A1 * | 7/2012 | Vechev | G06F 11/3612 707/613 |

OTHER PUBLICATIONS

Haris Volos et al, Mnemosyne: Lightweight Persistent Memory, ASPLOS'11, Mar. 5-11, 2011, Newport Beach, California, USA, 13 Pages.

Moraru, I, et al., Persistent, Protected and Cached: Building Blocks for Main Memory Data Stores, (Research Paper), Dec. 6, 2011, 24 Pages.

Wang, A.A-I, et al., The Conquest File System: Better Performance Through a Disk/persistent-ram Hybrid Design, (Research Paper), Aug. 2006, pp. 309-348, vol. 2, No. 3., 40 Pages.

* cited by examiner

400
Line 6
401a
R_u
x
1
null
402a
L
(print, "start")
(being-durable)
(malloc, s, x)
(store, x->data, 1)
(store, x->next, 0)
(end-durable)
403a
Q
404a
R_s
410
Line 12
401b
R_u
x
y
1
1
null
402b
L
(print, "success")
(being-durable)
(malloc, s, y)
(store, y->data, 1)
(store, y->next, 0)
(store, x->next, y)
403b
Q
(print, "start")
404b
R_s
x
1
null

ASYNCHRONOUS CONSISTENT SNAPSHOTS IN PERSISTENT MEMORY STORES

BACKGROUND

Non-volatile memory (NVM) retains stored data even after the power is turned off. The most widely used type of NVM has been flash memory. However, flash memory has to be written in larger blocks than typical computers can automatically address, and typically only lasts for a finite number of write-erase cycles before deteriorating. Newer types of NVM offer better performance while maintaining the non-volatility aspect of flash memory. These technologies include, for example, memristors, phase change memory (PCM), and spin-torque transfer RAM (STT-RAM).

Memristor devices are based on resistance switching effects, and allow greater data density than hard drives with fast access times. PCM devices handle read/write operations based on changes in electrical resistance, offering high storage density. STT-RAM devices "flip" the active elements used in magnetic random access memory (RAM), and offers lower power consumption with better scalability.

DETAILED DESCRIPTION

Figure 1:
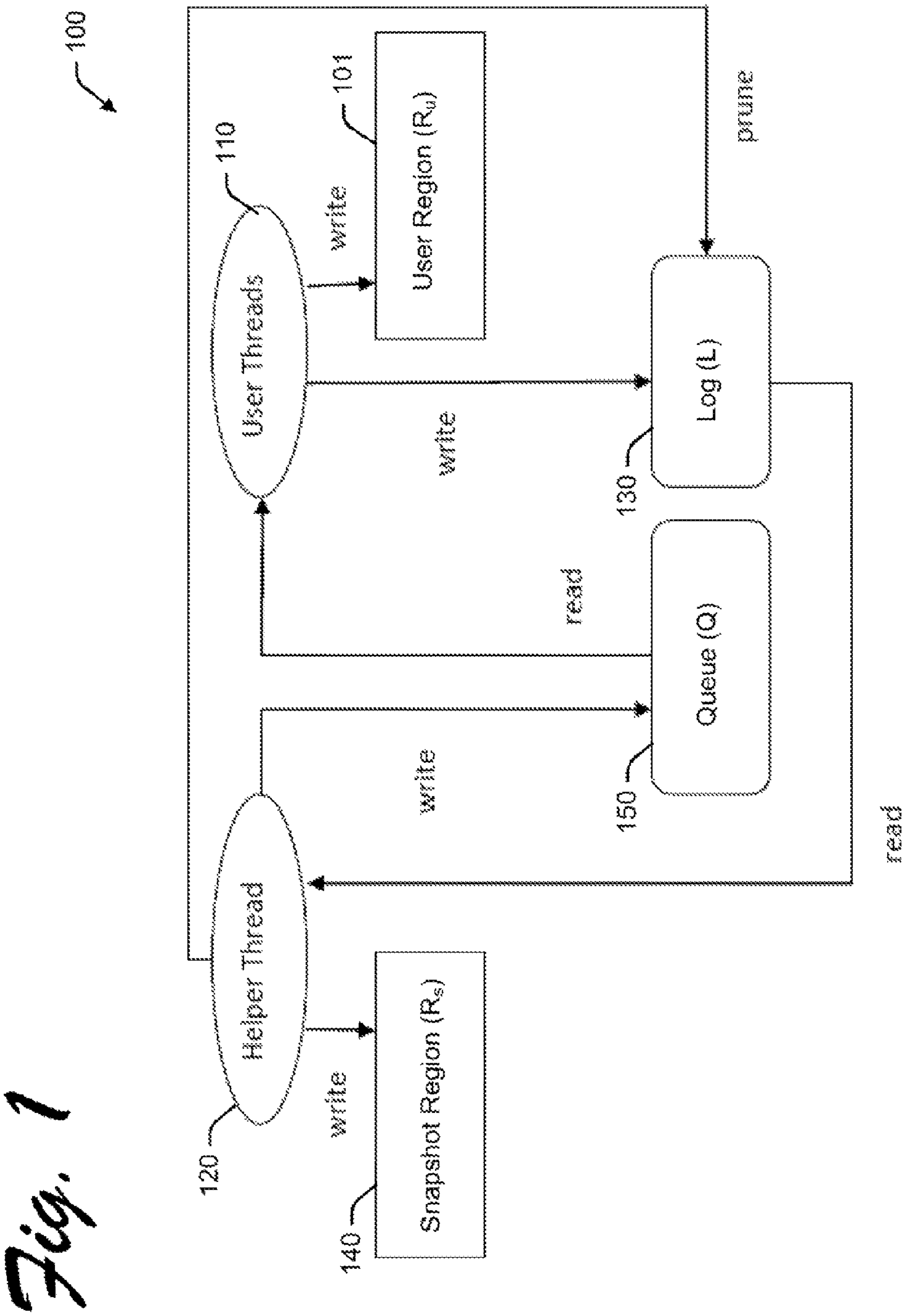
FIG. 1 is a high-level illustration of an example system which may be implemented for asynchronous consistent snapshots in persistent memory stores.

New non-volatile memory (NVM) technologies such as, but not limited to, memristors, phase change memory (PCM), and spin-torque transfer RAM (STT-RAM) offer an opportunity to redefine the data persistence model used by applications. Memory accesses at the byte granularity, along with latencies on par with dynamic random access memory (DRAM), enable fine-grain and efficient persistence of data through central processing unit (CPU) store instructions. However, the combination of caches and the presence of faults in the computing environment pose a challenge in ensuring that persistent data is consistent, for example, during recovery following a crash.

The term "consistent state" is used herein to mean that all program invariants are met. Without a mechanism to enforce program invariants, a hardware or software failure may render persistent data corrupt and hence unusable to applications.

Write back caching, the default for many systems today, complicate matters by delaying visibility of writes in persistent memory. Consider, for example, an instruction sequence where a chunk of memory is allocated, then initialized, and then a globally visible pointer is made to point to the chunk. In the presence of caching, the globally visible location may appear in persistent memory before the initialized values. In this scenario, if a program crashes before the initial values are written to persistent memory, the persistent state will be left with a globally visible memory location pointing to uninitialized memory, resulting in an undesirable operating condition.

In order to reduce or altogether prevent such inconsistencies, programmers may employ a combination of instructions that act as a barrier between two data stores. This barrier will henceforth be referred to as a "visibility barrier". For example, a combination of a memory fence and a cache line flush may be used between two stores of persistent memory to ensure that the first store is visible on NVM before the second store becomes visible. Given a virtual address, a cache line flush command flushes the corresponding cache line to memory and invalidates the cache line. But these low level constructs make programming tedious and error prone.

Programmers may also use transactional consistency semantics for critical sections and atomic sections of multithreaded programs. A "critical section" is a code segment where the shared data are protected by locks. An "atomic section" is a code segment that has to appear to execute in an indivisible and isolated manner. In serial and distributed programs, a construct, that provides failure-atomicity (and hence consistency) for a section of code, can be provided. Frameworks that try to provide the appropriate guarantees for these code constructs may use undo logging and make use of a similar barrier as described above. If the program crashes, the state of the application can be reestablished by "replaying" undo logs during recovery.

However, the process has to ascertain that an undo log entry is visible on the NVM before the corresponding store is visible, for example, by adding a visibility barrier between an entry in the undo log and the original store to the NVM. Additional instances of the visibility barrier are used while creating a given entry in the undo log to ensure that different parts of the entry are mutually consistent. Executing a visibility barrier can be computationally expensive (e.g., taking hundreds of CPU cycles or longer to execute).

The systems and methods described herein reduce the overhead of capturing a consistent state using infrastructure-maintained data structures (i.e., data structures created/maintained in transient memory and NVM), and includes logs and a snapshot. The logs are created in transient memory (e.g., DRAM) instead of in the NVM itself. In addition, the consistent snapshot is maintained in the NVM. Thus, the question of correct ordering of visibility of log entries does not arise any more because the log entries are no longer in the NVM. Hence, the visibility barriers can be removed from the code executed by the user threads. Removing visibility barriers from the user threads (i.e., the critical processing path) improves performance of failure-free operation by allowing user threads to operate at or near the full execution speed of the underlying program. The systems and methods described herein may be efficiently implemented in the processing environment on machines utilizing NVM technologies (e.g., memristors, PCM, and STT-RAM), as well as on machines utilizing block devices, such as hard disks and solid state drives (SSDs).

Before continuing, it is noted that as used herein, the terms "includes" and "including" mean, but are not limited to, "includes" or "including" and "includes at least" or "including at least." The term "based on" means "based on" and "based at least in part on."

FIG. 1 is a high-level block diagram of an example system 100 which may be implemented for asynchronous consistent snapshots in persistent memory stores. In FIG. 1, persistent data entities $R_u$ in block 101 and $R_s$ in block 140 are illustrated by square-corner rectangles, while the transient data entities L in block 130 and Q in block 150 are illustrated by rounded-corner rectangles. Execution entities are illustrated by ovals, and interactions between execution entities and the data entities are illustrated by solid lines between the entities. Arrows indicate direction of data flow. For purposes of illustration, a user thread 110 may write to user region $R_u$, and a helper thread 120 may read logs L from transient memory 130, among other operations.

System 100 may be implemented in the processing environment of any of a wide variety of computing devices, such as, but not limited to, stand-alone desktop/laptop/netbook computers, workstations, server computers, blade servers, mobile devices, and appliances (e.g., devices dedicated to providing a service), to name only a few examples. The computing devices (not shown) may include memory, storage, and a degree of data processing capability at least sufficient to execute the program code described herein.

The system 100 may be implemented in a region of abstraction to present persistent memory to applications. Accordingly, the region of abstraction is referred to herein as a persistent user region (or simply as "user region"). An example user region $R_u$ is shown in block 101 in FIG. 1, as the user region $R_u$ may be implemented as data structures in the NVM that are used by the program during program execution. Without lack of generality and for the sake of simplicity, only one user region $R_u$ is shown in FIG. 1, although more than one user region may be implemented.

The user region $R_u$ is addressable by a range of virtual addresses that are mapped to physical pages in the NVM. An Application Programming Interface (API) for creating and accessing the user region $R_u$ is not the focus of this disclosure, and therefore the API is not described in detail. Briefly, however, if a programmer wants to create a user region $R_u$ in the program, the user region $R_u$ is created (e.g., by calling CreateRegion) and persistent data structures are allocated out of the user region $R_u$ (e.g., by calling nvm_alloc). The nvm_alloc has a corresponding nvm_free, and the user region $R_u$ has a persistent root (e.g., within the same persistent region at a fixed offset) for the purpose of accessing the data structures therein. It is noted that data within a persistent region is not serialized, and so pointers may be embedded in the program.

Without loss of generality, the user region $R_u$ is mapped at the same base address in the virtual address space, and hence the embedded pointers can be used as-is without relocation. While the program is executing, any data within the user region $R_u$ that is not reachable from the region's persistent root (or from a program root) is considered "garbage" and the physical space can be "recycled" by returning the memory to general use. The physical space can be recycled during program execution or during recovery after a program crash.

FIG. 1 also illustrates program execution and data components in the system 100. Program execution is illustrated by executing entities (shown as ovals in FIG. 1), which include user threads 110 and helper thread 120. The term "user thread" is used herein to refer to part of the original program. User threads 110 handle the program execution. The term "helper thread" is used herein to refer to a thread that is spawned by the underlying infrastructure in the computing environment. Helper thread 120 helps maintain a consistent state during program execution. Use of the helper thread 120 removes much of the computational overhead previously needed for consistency management, freeing the critical path for user threads 110, and thereby improving runtime performance.

During program execution, the user threads 110 write logs L to transient memory 130. It is noted that by writing the logs L to transient memory, the logs L will be cleared from memory in the event of a program crash or system restart. Accordingly, the helper thread 120 reads the logs L 130 from transient memory and generates a snapshot region $R_s$ in the NVM. The snapshot region (or simply "snapshot") $R_s$ includes data of all consistent user regions in the NVM. The snapshots are written to a persistent region of the processing environment (e.g., in NVM). The helper thread 120 generates snapshots $R_s$ when the processing environment is at a consistent state (e.g., after the user threads 110 complete a transaction).

In an example, the helper thread 120 utilizes a queue 150 for input-output (I/O) operations. The queue 150 may be maintained in transient memory (e.g., DRAM) to coordinate I/O between the user threads 110 and the helper thread 120. As noted above, the queue 150 is written to transient memory and thus "disappears" if the program crashes. However, the snapshot Rs has been written to NVM and thus can be utilized during a system recovery to restore the processing environment to the most recent consistent state.

The operations described above may be implemented by program code or machine readable instructions executed by the processing environment. In an example, the machine-readable instructions may be implemented as, but not limited to, firmware or other program code. The machine readable instructions may execute the functions as self-contained modules. These modules can be integrated within a self-standing component, or may be implemented as agents that run on top of existing program code. The machine-readable instructions may be stored on non-transient computer readable media and are executable by one or more processing unit(s) to perform the operations described herein. It is noted, however, that the components shown in FIG. 1 are provided only for purposes of illustration of an example operating environment, and are not intended to limit implementation to any particular architecture. In the example referenced by FIG. 1, the architecture of machine readable instructions may execute as follows.

For every store to user region $R_u$, the user thread 110 creates a log entry L 130 in transient memory. Logging may be performed in a "lazy" manner. That is, there is no ordering requirement between visibility of the log entry and the store to $R_u$. Additionally, there is no requirement to use a visibility barrier between different log entries, because the data entity L is not stored in the NVM regions 101 or 140. Thus, creating the log L can proceed asynchronously in relation to the user thread 110.

At various times (e.g., on a timer pop), the helper thread 120 examines the data entity 130, and computes a globally consistent state $G_c$. A globally consistent state $G_c$ is typically defined at the completion of a transaction, although other definitions may be employed (e.g., completion of multiple transactions, or at predefined times or points in the program code). Every time a globally consistent state $G_c$ is computed, the state of the snapshot $R_s$ is updated in a failure-atomic manner. This update may occur serially, because only one helper thread 120 needs to be instantiated to update the data entity 140 with the snapshot $R_s$. A failure-atomic update means that if a crash happens during an update, either all or none of the values being updated are visible in data entity 140.

It is noted that while this step can be said to be operationally expensive, this is the only step that uses a failure-atomic update. This is the only step that may use visibility barriers. Any cost during this step is incurred by the helper thread 120 (not the user threads 110), and therefore this update does not slow execution by the user threads 110. As such, failure-free operation can proceed fairly efficiently.

It is noted that the helper thread 120 may "prune" the logs L from data entity 130 upon completion of a successful snapshot $R_s$. For example, the helper thread 120 may clear the unnecessary entries from logs L 130 and return the associated memory space in transient memory to the processing environment for use by the user threads 110. Once created, the snapshot $R_s$ is not removed until the end of the program, thus providing a rollback position for the system to a globally consistent state $G_c$ during restart following a system crash.

If the program crashes or the system otherwise needs to return to a globally consistent state $G_c$, a recovery process can be executed during restart as follows. The recovery process reads the snapshot $R_s$ 140 stored in the nonvolatile region of the NVM to overwrite a potentially inconsistent user region $R_u$ 101 in the nonvolatile memory. If $R_u$ was updated after the last snapshot was written into data entity $R_s$, and before the program crash, then these updates may be lost. However, user region $R_u$ is now guaranteed to be in a globally consistent state $G_c$, based on the snapshot $R_s$. Unreachable regions in $R_u$ can be garbage collected and memory space returned to the NVM.

It is noted that the recovery process does not have to be failure-atomic, because the snapshot $R_s$ is not removed until the recovery process successfully completes. If a system crash occurs again (e.g., during the recovery process or before a new snapshot is generated), the recovery process can be re-applied using the most recent snapshot $R_s$.

Figure 2:
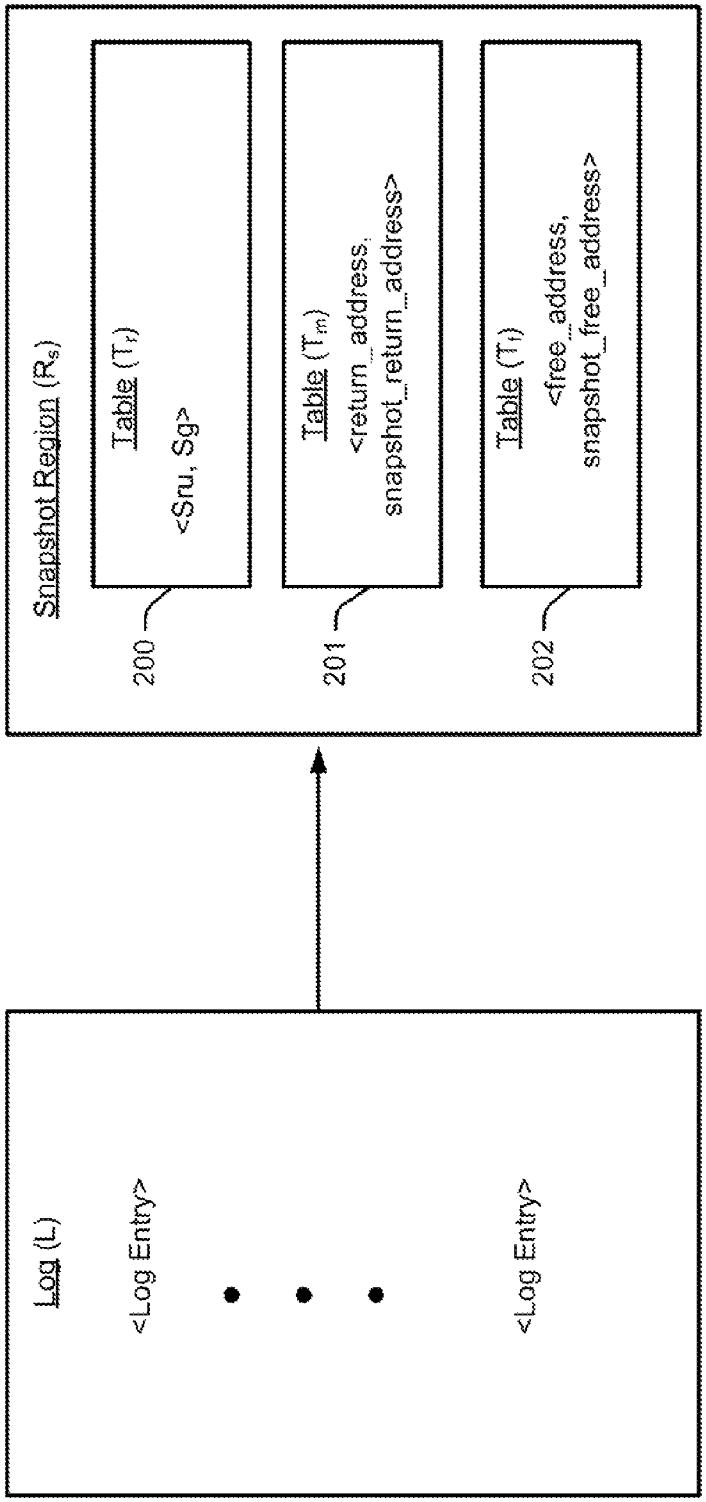
FIG. 2 illustrates generating a snapshot.

Any data in the snapshot region $R_s$ can be logically described as a list of duples, where each duple is a pair containing a memory address ($M_n$) and a corresponding value ($M_v$). Memory address $M_n$ denotes a virtual address allocated within user region $R_u$. However, to exploit spatial locality, chunks of memory may be maintained in $R_s$ to shadow allocated chunks of memory in $R_u$. In effect, these have a one-to-one mapping. An example build process of snapshot region $R_s$ may be implemented as illustrated in FIG. 2.

For every store to user region $R_u$, the user thread writes a redo log entry in logs L. The log entry may have an operation code, an address of the location, and the value written.

A log entry is created for every call to CreateRegion. The operation code (e.g., one identifying CreateRegion), the returned address (e.g., the start address of the assigned region, $S_{ru}$) and the size of the region are added to the log entry.

A log entry is also created for every memory manipulation request. Without lack of generality, the operations may be memory allocation (e.g., nvm_alloc) and memory deallocation (e.g., nvm_free). For the operation nvm_alloc, the log entry stores an operation code, the returned address, and the size. For the operation nvm_free, the log entry stores an operation code and the address provided. It is noted that the address logged for either operation nvm_alloc or operation nvm_free belongs to user region $R_u$, and no memory manipulation happens in the snapshot region $R_s$ at the point of creating these log entries.

The snapshot region $R_s$ is created and manipulated by the helper thread 120. Hence, the snapshot region $R_s$ can be manipulated in a serial fashion. When a program starts, no corresponding snapshot region $R_s$ exists. If the program crashes before snapshot region $R_s$ can be created, the situation is detected during recovery and the root pointer in user region $R_u$ is set to NULL. Thus, all other data in user region $R_u$ become unreachable and are garbage-collected. In essence, this scenario reverts user region $R_u$ to the initial state as it was just after creation. If a program crashes after $R_s$ is created, $R_s$ is used to overwrite $R_u$ during the recovery phase.

When the helper thread computes a globally consistent state, the helper thread proceeds to update snapshot region $R_s$ with this newly computed state in a failure-atomic manner. So if the program crashes during this update of snapshot region $R_s$, none of the changes in this globally consistent state are visible in snapshot region $R_s$ during the recovery process and user region $R_u$ reverts to the previous globally consistent state.

The globally consistent state $G_c$ is computed from the log entries in the log L, and thus the globally consistent state $G_c$ is made up of a subset of those log entries in data entity L. Snapshot region $R_s$ is updated with this newly computed state by "walking" the associated log entries with accompanying actions, depending on the operation code of the log entry walked. The log entries may be walked in the order created or in some other order that preserves dependencies among log entries. It is noted that during this walk, only snapshot region $R_s$ is updated, and user region $R_u$ is not updated.

FIG. 2 illustrates generating a snapshot. In an example, three tables 200, 201, and 202 are created in snapshot region $R_s$. The tables 200-202 include a "region" allocation table $T_r$, a "malloc" maintenance table $T_m$, and a "free" maintenance table $T_f$. Table $T_r$ maintains the created regions in the log entries associated with the computed globally consistent state. Table $T_m$ tracks the blocks of memory allocated. Similarly, table $T_f$ tracks the blocks of memory freed.

Specific actions may be executed during creation of a snapshot depending on the particular opcode. The following are examples of some opcodes.

1. opcode=CreateRegion
2. opcode=nvm_alloc
3. opcode=nvm_free
4. opcode=store

If opcode is 'CreateRegion', a corresponding region is created in snapshot region $R_s$. The start address of the newly created region in snapshot region $R_s$ may be denoted as $S_g$. The start address $S_{ru}$ of the region previously created by the user thread is available from the log entry. Thus, the offset can be determined (e.g., offset=$S_{ru}-S_g$). At the same time, table $T_f$ is updated with a new entry (e.g., start addresses <$S_{ru}$, $S_g$>).

Consider opcode=nvm_alloc. If <nvm_alloc, return_address, size_s> is encountered, memory is allocated within $R_s$ at the address snapshot_return_address=(return_address-offset) of size size_s. Table $T_m$ is updated with the duple <return_address, snapshot_return_address>.

Consider opcode=nvm_free. If <nvm_free, p> is encountered, memory at address snapshot_free_address=(p−offset) is freed within snapshot region $R_s$. Table $T_f$ is updated with the duple <p, snapshot_free_address>.

Consider opcode=store. If <store, address, val> is encountered, val is stored at the address <address-offset> within snapshot region $R_s$.

It is noted that the tables $T_r$, $T_m$, and $T_f$ may be used during the recovery process to overwrite the state in user region $R_u$, with the state in snapshot region $R_s$. Thus, the tables provide a mapping of data between these memory states.

In an example, the update to snapshot region $R_s$ may occur in a failure-atomic manner. This means that when the snapshot is updated from one globally consistent state to a more recent consistent state, either all or none of these updates should be visible in the snapshot on NVM.

To correctly handle input/output (I/O) (or externally visible operations), these operations may be deterred until the snapshot $R_s$ is updated with the globally consistent state $G_c$ that overlaps with the I/O operation. Globally consistent state $G_c$ overlaps with an operation if a log entry exists within a globally consistent state $G_c$ that corresponds to that operation. For an I/O operation to be issued, it does not matter whether the corresponding updates to user region $R_u$ have actually made their way all the way to persistent memory.

Figure 3:
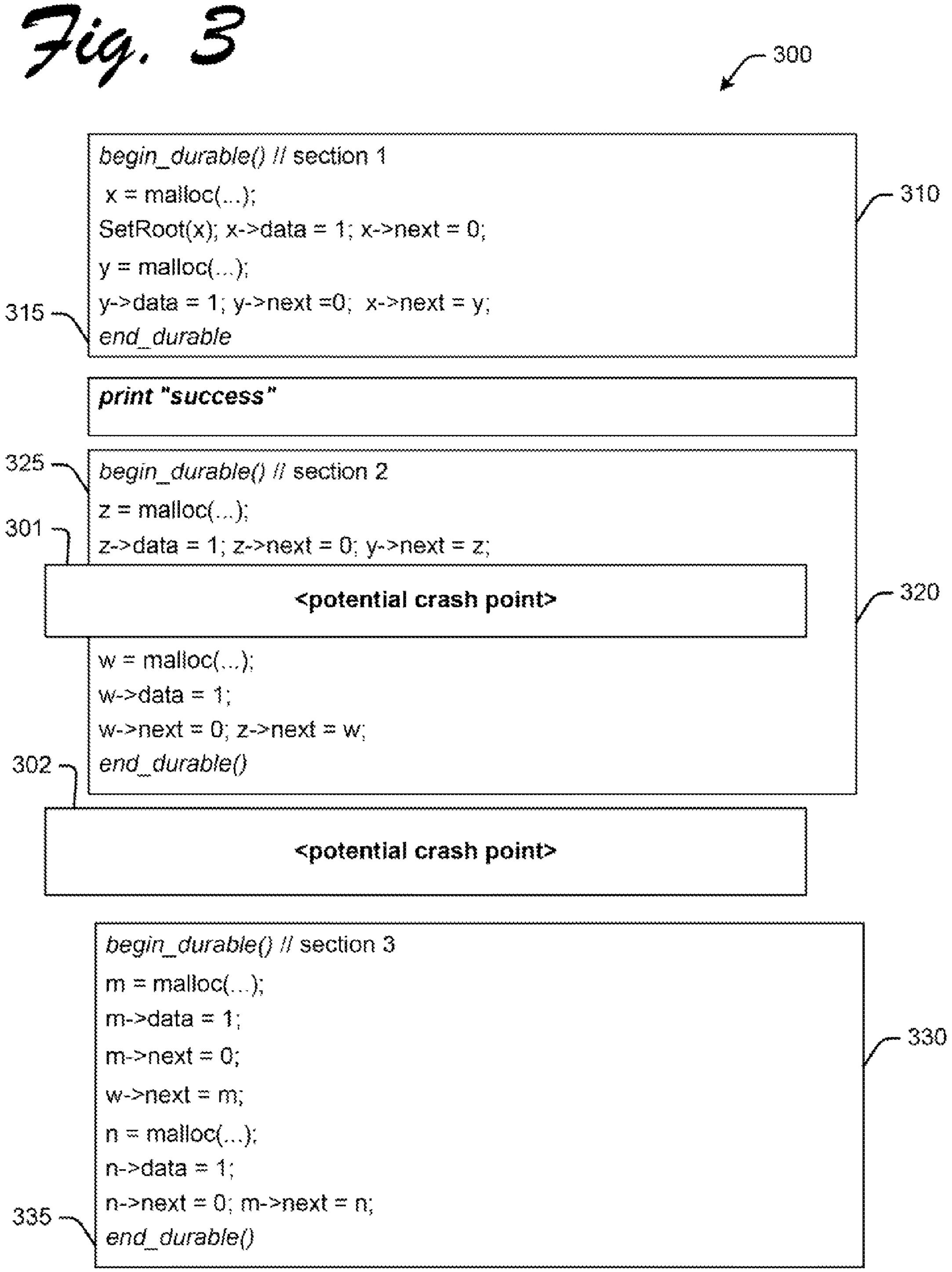
FIG. 3 illustrates updating snapshots with a most recent globally consistent state.

FIG. 3 illustrates a program written using durable sections, an I/O operation in the program, and illustrates example crash scenarios. A durable section of code means that all or none of the effects of the operations enclosed should appear to complete and be visible on the NVM. Note that the two potential crash points shown in FIG. 3 are for purposes of illustration only (and not limiting). The following discussion explains what may happen if crashes do occur at those points. Program 300 is shown with three durable code sections 310, 320, and 330, and potential crash points 301 and 302 for purposes of illustration. Program points 315, 325, and 335 represent successful completion points of durable sections.

In this example, the potential crash point 301 occurs just before an I/O statement occurring after the first durable section 310 has completed. As such, a globally consistent state 315 exists for recovery and a corresponding snapshot may be available on NVM.

It is noted that the globally consistent state available at program point 315 does not include the subsequent print statement (illustrated as print "success" in the code shown in FIG. 3). Consequently, the user thread does not execute this I/O operation immediately, and the operation is instead buffered. Buffering may be implemented by encoding the operation code (e.g., the print statement) and the values of the corresponding arguments, when the log entry is created. Buffering may occur in a logical manner within the helper thread, so that when the appropriate globally consistent state is reached, the helper thread can perform the externally visible operation on behalf of the user thread. I/O operations are executed by the helper thread in the order that these operations are supposed to be executed by the user thread.

If the program successfully executes beyond crash point 301, then a subsequently computed globally consistent state computed at program point 325 overlaps with the print statement. Accordingly, the helper thread executes the print statement subsequent to computation of this globally consistent state.

If a crash occurs at the program point 302, the most recent globally consistent state is the one computed at program point 325. Thus on recovery, the values corresponding to globally consistent state 325 are copied from the snapshot region to the user region of the NVM. Thus, on recovery, the available consistent state based on the snapshot on persistent memory is in sync with the I/O statements executed before the crash. For example, in FIG. 3, the I/O statement "print "success" does not have to be re-issued after recovery.

Creating logs L in the user thread and having the helper thread consume logs L establishes a producer-consumer relationship, where the user thread produces and the helper thread consumes. Accordingly, a two-way communication may be implemented transparently between the user thread and the helper thread to coordinate the I/O operations and the values exchanged.

In an example, a queue Q 150 (see FIG. 1) may be utilized. The queue Q 150 may be created in transient memory. Thus, if a crash occurs at this point, queue Q 150 may disappear. If the user thread needs the result of an I/O operation which does not yet have the ready status in this queue Q 150, then the user thread is blocked. The queue Q 150 may be implemented transparently, wherein the helper thread maintains the identity of the I/O operation completed in addition to its status. The helper thread is considered the "producer" and the user thread is the considered the "consumer" of this data structure Q 150. The queue Q is finalized only after the corresponding persistent snapshot 140 is successfully updated.

With reference again to the example illustrated in FIG. 3, if the program successfully executes through all durable sections (e.g., to program point 335), then the region root points to x. In turn, x→next points-to y, y→next points-to z, z→next points-to w, and so forth.

If instead the program crashes at program point 301, the persistent user data is: the region root points-to x, x→next points-to y, and y→next points-to z. It is also possible that some of these updates are not yet visible on non-volatile memory. However, the snapshot $R_s$ 140 has been updated prior to the crash point 301, such that snapshot $R_s$ 140 corresponds to the end of the first durable section. Hence, snapshot $R_s$ 140 includes the following information: the region root points-to x, x→next points-to y, y→next points-to null. When data from the snapshot $R_s$ 140 is copied to the user region $R_u$ 101 during recovery, then z is unreachable and it can be garbage collected. Similarly, if existing locations were freed in the second (incomplete) durable section, the effects of the de-allocation operations won't be visible and show up as still being allocated. Thus, it can be seen that correct semantics are still presented even in the face of failures.

Figure 4:
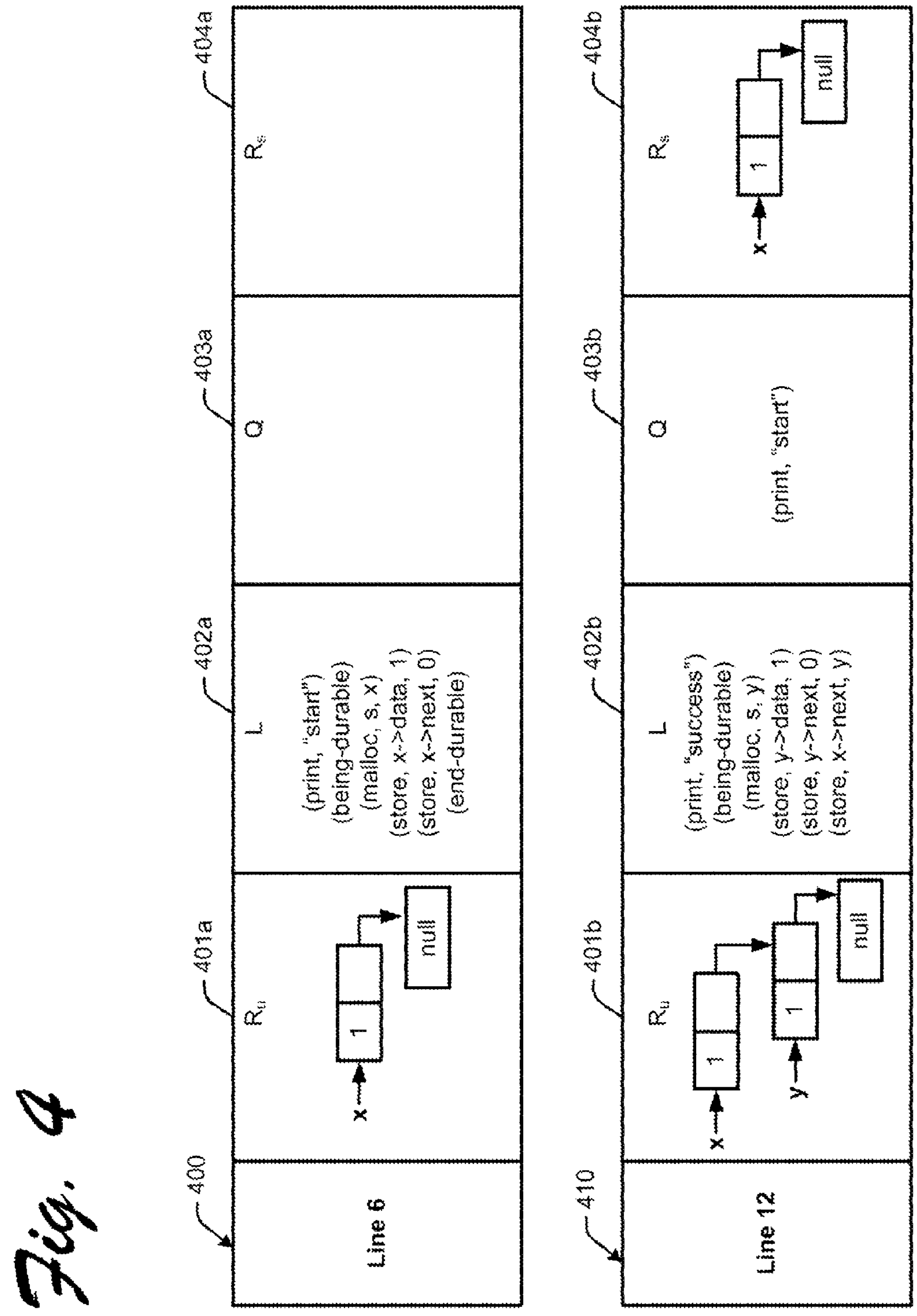
FIG. 4 illustrates example states of a user region, log entries, queued operations, and a snapshot for a program.

Data operations may be better understood with reference to the example shown in FIG. 4. FIG. 4 illustrates example states 401*a*-*b* of a user region 101 ($R_u$), log entries 402*a*-*b* in log 130(L), operations 403*a*-*b* in queue 150 (Q), and data 404*a*-*b* in a snapshot region 140 ($R_s$) for a program. The example illustrated by FIG. 4 is based on the following program segment:

```
 1: print "start"
 2: begin_durable( ) // section 1
 3: x = malloc(...);
 4: x->data = 1;
 5: x->next = 0;
 6: end_durable( )
 7: print "success"
 8: begin_durable( ) // section 2
 9: y = malloc(...);
10: y->data = 1;
11: y->next = 0;
12: x->next = y;
<potential crash point 1>
```

It is noted that the initial state is empty for all data structures. However, the log continues to grow as more instructions are executed. The end of the first durable section corresponds to line 6 in the code, illustrated by block 400 in FIG. 4. The log entries 402*a* end at end_durable( ) at line 6. The snapshot region may not have been updated at this point, so it is seen to be empty in 404*a*. Because no I/O operation has been issued, 403*a* is also empty. The state of the logs and other data structures at program point identified by line 12 is shown in block 410.

The state of the log L at line 12 is the union of the log entries shown for line 6 and line 12. That is, at some point between lines 6 and 12, a globally consistent state is computed and a corresponding snapshot is created and copied to the NVM in a failure-atomic manner. This snapshot only contains x as shown in 404*b*.

After generating the snapshot, the helper thread issues the print ("start") command and records this action in the queue Q as shown in 403*b*. In the event of a crash at <potential crash point 1> (in the above code segment), the recovery operation overwrites the state of the user region with the snapshot. Just before the crash point, the user region 101 has both x and y with x→next pointing to y. But this is an inconsistent state because the second durable section started in line 8 in the above code segment has not yet completed. On recovery, the data in snapshot region 140 (which has only x as shown in 404*b*) is used to overwrite the data in the user region. It is noted that this is also consistent with the print("start") command having already been issued, although the print("success") command has not yet been issued.

Before continuing, it should be noted that the examples described above are provided for purposes of illustration, and are not intended to be limiting. Other devices and/or device configurations may be utilized to carry out the operations described herein.

Figure 5:
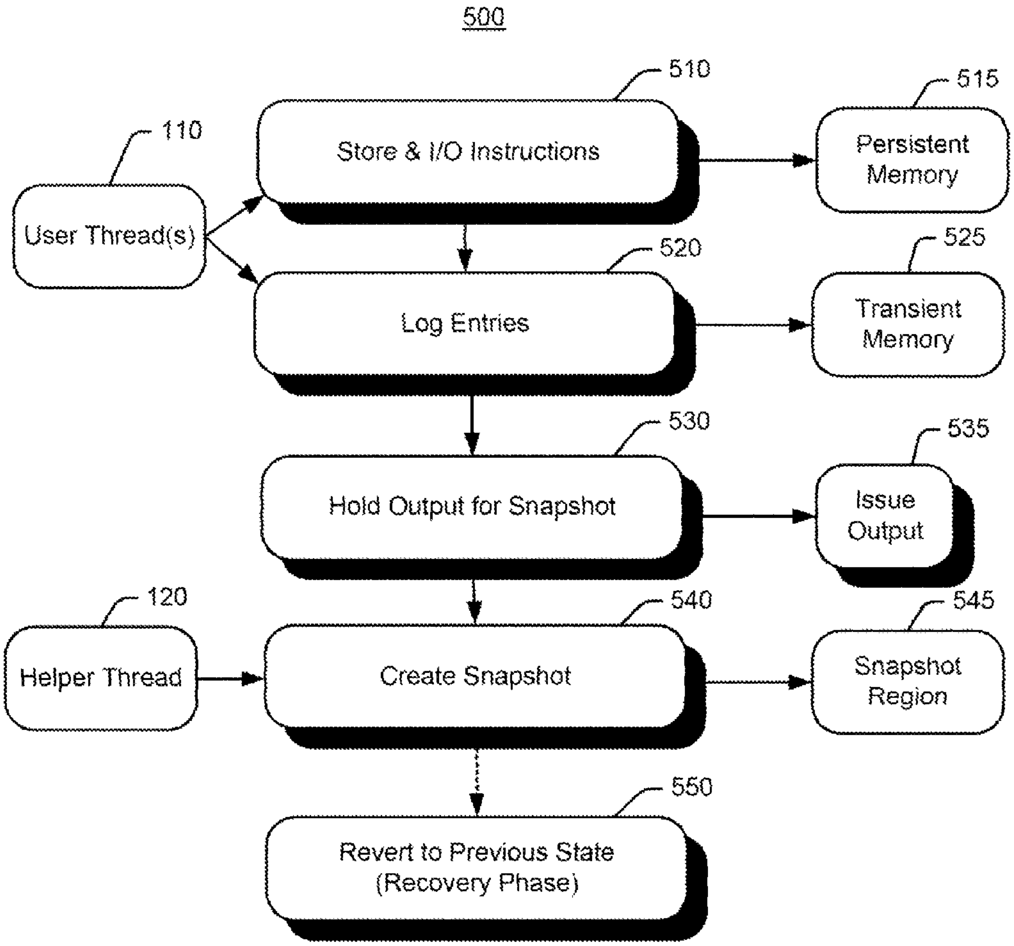
FIG. 5 is a flowchart illustrating example operations which may implement asynchronous consistent snapshots in persistent memory stores.

FIG. 5 is a flowchart illustrating example operations which may implement asynchronous consistent snapshots in persistent memory stores. Operations 500 may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

In operation 510, store and I/O instructions (such as writing to a file) are issued by the user thread(s) 110 to persistent memory 515. Store instructions change the state of persistent memory and I/O instructions are interactions with the "outside world" (e.g., outside of the processing environment). In operation 520, the store and I/O instructions are logged by the user threads 110 to transient memory 525. The output is held in operation 530 for a snapshot (and later issued in operation 535 when a snapshot is generated). When the program stores to a persistent data structure 515, the effect of that store is visible in a user region. As noted above, the user region is maintained in persistent memory 515.

Operation 540 includes the helper thread 120 creating a snapshot region 545 in the persistent memory 515 for each of the log entries in transient memory 525. In an example, the helper thread 120 creates the snapshot only after reaching a consistent state during execution of the program. The snapshot region provides a rollback position during restart following a crash. Accordingly, in operation 550 during the recovery phase, the processing environment can revert to a previous state represented by the snapshot of data at a most recent consistent state.

The operations shown and described herein are provided to illustrate example implementations. It is noted that the operations are not limited to the ordering shown. It is also noted that various operations described herein may be automated or partially automated. Still other operations may also be implemented.

The method reduces processing overhead by creating the logs in transient memory (instead of in the NVM itself), and maintaining a consistent snapshot in the NVM. Thus the log entry does not need to be visible on the NVM before the corresponding persistent store. This also allows removal of all instances of a visibility barrier from the user threads, and improves the performance of failure-free operation dramatically, because the user threads can now operate at or near the full execution speed of the underlying program.

It is noted that the examples shown and described are provided for purposes of illustration and are not intended to be limiting. Still other examples are also contemplated.

The invention claimed is:

1. A method for crash recovery with asynchronous consistent snapshots in persistent memory stores of a processing environment including a user program and infrastructure-maintained data structures, wherein the infrastructure-maintained data structures include a log of updates made to program data structures and a snapshot of the state of the program data structures, the method comprising:

writing log entries in the log of updates to a transient memory, wherein the log entries correspond to store instructions and memory management instructions operating on a nonvolatile memory (NVM), and input/output (I/O) operations executed by program instructions of the user program, wherein each of the log entries represents an effect of a corresponding operation in the program instructions; and creating a snapshot in the NVM after a consistent program point based on the log of updates, wherein the snapshot provides a rollback position during restart following a crash and wherein creation of the snapshot comprises creating and maintaining a mapping between addresses of data structures created on NVM by the program instructions and a corresponding state of data structures in the snapshot, wherein the mapping is persistent and resides in the snapshot.

2. The method of claim 1, wherein the program instructions are executed by user threads, and a helper thread creates the log entries and computes the snapshot from the log entries.

3. The method of claim 1, wherein the log entries are created asynchronously with respect to the corresponding operations in the user program to eliminate execution and visibility ordering between creation of the log entries on the transient memory and the corresponding operations in the program instructions on persistent memory.

4. The method of claim 1, wherein the snapshot is created and updated asynchronously with respect to the corresponding operations in the program instructions to eliminate ordering between visibility of the snapshot on persistent memory and visibility of the corresponding operations in the program instructions on persistent memory.

5. The method of claim 1, further comprising holding I/O operations until all of the I/O operations are captured by the snapshot.

6. The method of claim 1, wherein the snapshot is created by walking the log entries and copying data from the log entries to the snapshot in a failure-atomic manner to guarantee that either all or none of the snapshot is visible on the NVM regardless of computer failures.

7. The method of claim 6, further comprising replacing an existing snapshot for a first consistent program point with a newly computed snapshot for a second consistent program point when the second consistent program point arrives later than the first consistent program point in program execution order.

8. The method of claim 6, further comprising removing the log entries rendered unnecessary by computation of the snapshot.

9. The method of claim 1, wherein the mapping in the snapshot identifies data in the snapshot that replaces corresponding data in the program data structures during recovery after a system crash.

10. The method of claim 9 further comprising discarding any data within the program data structures not replaced by the snapshot data structures.

11. A system for crash recovery with asynchronous consistent snapshots in persistent memory stores of a processing environment, comprising a user program;

infrastructure-maintained data structures with a log of updates made to program data structures and a snapshot of the state of the program data structures;

program code stored on non-transient memory and executable by a processor to:

write log entries in the log of updates to a transient memory, wherein the log entries correspond to store instructions and memory management instructions operating on a nonvolatile memory (NVM), and input/out (I/O) operations executed by program instructions of the user program, wherein each of the log entries represents an effect of a corresponding operation in the program instructions; and create a snapshot in the NVM after a consistent program point based on the log of updates, wherein the snapshot provides a rollback position during restart following a crash and wherein creation of the snapshot comprises creating and maintaining a mapping between addresses of data structures created on NVM by the program instructions and a corresponding state of data structures in the snapshot, wherein the mapping is persistent and resides in the snapshot.

12. The system of claim 11, wherein the program code is further executable to create the log entries asynchronously with respect to the corresponding operations in the user program.

13. The system of claim 11, wherein the program code is further executable to create and update the snapshot asynchronously with respect to the corresponding operations in the program instructions.

14. The system of claim 11, wherein the program code is further executable to replace an existing snapshot for a first consistent program point with a newly computed snapshot for a second consistent program point when the second consistent program point arrives later than the first consistent program point in program execution order.

* * * * *